Aug. 25, 1942.   J. E. O'NEILL   2,293,749
DIAMOND TOOL
Filed Oct. 29, 1940

INVENTOR
Joseph E. O'Neill
BY
W. Glenn Jones
ATTORNEY

Patented Aug. 25, 1942

2,293,749

UNITED STATES PATENT OFFICE 2,293,749

DIAMOND TOOL

Joseph E. O'Neill, Kenilworth, Md.

Application October 29, 1940, Serial No. 363,324

8 Claims. (Cl. 125—11)

(Granted under the act of March 3, 1883, as amended April 30, 1928; 370 O. G. 757)

This invention relates to a diamond tool primarily adapted for use in dressing the faces of grinding wheels but adapted also for other cutting operations.

It is an object of this invention to provide a diamond tool of such form that its point may be rotated with a very small radius about a fixed axis through an arc of 180 degrees or more in cutting concave profiles in the face of a grinding wheel or other work. This is not possible with known diamond tools, due to interference of portions of the tool with the work when deep concave arcs are attempted.

Referring now to the drawing.

Figure 1:
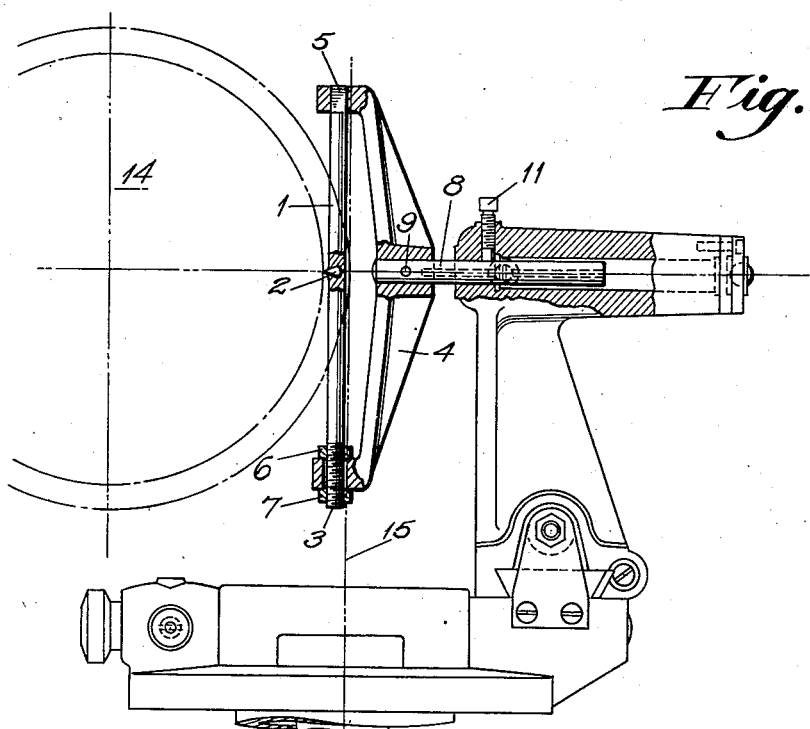
Fig. 1 is a side elevational view, partly in section, of the diamond tool, shown mounted on a grinding wheel dressing attachment.

The diamond tool comprises a round rod 1 in which a diamond 2 is embedded with only its point protruding. The ends of the rod are thrust through holes in the ends of the arms of a C-shaped support 4. The lower end of the rod is shown threaded at 3. The upper end of the rod is squared at 5 and fits snugly within a squared hole. Two nuts 6 and 7 threaded on the end 3 allow adjustment of the position of the diamond between the ends of the arms and lock it in position.

The support 4 is carried by a rod 8 to which it is secured by a tapered pin 9. The rod 8 in turn is held in a bore in a tool head 10 of a grinding attachment. The one shown is of the type disclosed in my application Serial No. 363,-323, filed of even date, but it may be of any type adapted to give arcuate movement to the diamond tip in the requisite manner. A set screw 11 holds the rod 8 in longitudinal position. A dog point set screw 12 engages a keyway 13 in the rod 8 to hold it from rotation.

Figure 2:
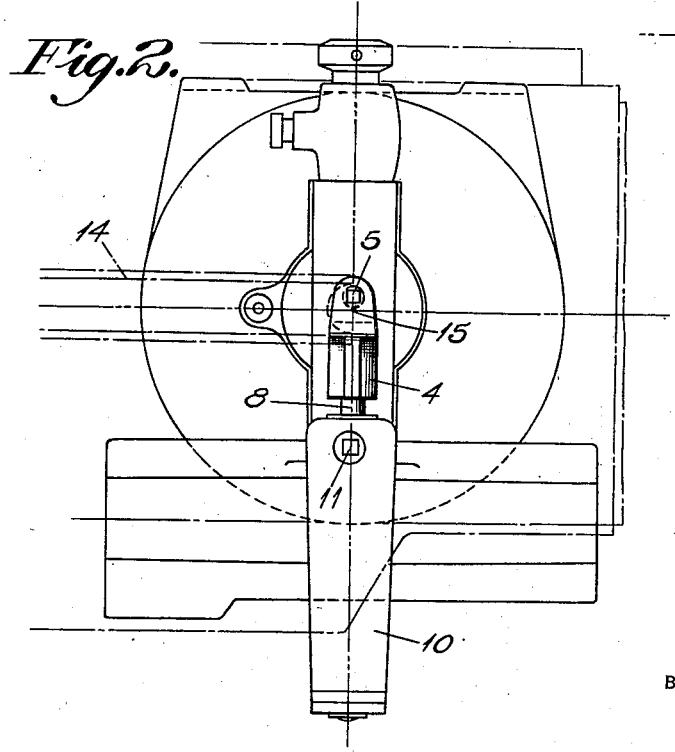
Fig. 2 is a top plan view of the tool and attachment as shown in Fig. 1.
Figure 3:
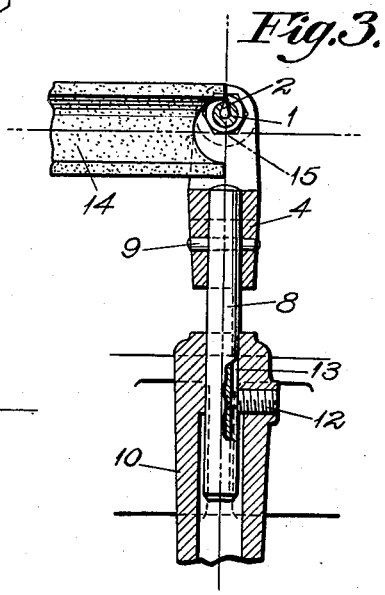
Fig. 3 is a top plan view in section of a fragment of Fig. 2.

The tool is shown in working position with respect to a grinding wheel 14. In Fig. 1 the tool is in neutral position with respect to the wheel. In Figs. 2 and 3 it is shown at a position 90° from neutral and a concave profile of 180° in arc is shown as having been generated on the wheel. The dressing attachment rotates the tool about an axis 15.

It will be noted that the diamond point may be rotated in an arc having a radius the minimum limit of which is the distance from the point to the axis of the rod 1, and that if desired an arcuate cut may be taken with this radius up to a complete circle. The point of the diamond only need protrude from the surface of the rod a distance sufficient to allow the diamond to penetrate a desired amount into the material to be cut, since under those conditions the uncut portion of the work will clear the rod at all points. The arc of rotation of the diamond point may have a maximum radius limited only by the amount of adjustment provided on rod 8.

For use with work which does not require a cutting edge of diamond hardness, other cutting edges may be employed, either by embedding an insert of hard material in the rod in lieu of the diamond or by use of a hardened portion of the rod shaped to form a cutting edge.

According to the provisions of the patent statutes, I have set forth the principal mode of operation of my invention and have illustrated and described what I now consider to represent its best embodiment. However, I desire to have it understood that within the scope of the appended claims the invention may be practiced otherwise than as specifically illustrated and described.

The invention described herein may be manufactured and/or used by or for the Government of the United States of America for governmental purposes without the payment of any royalties thereon or therefor.

I claim:

1. For use in a device having a tool-head mounted for arcuate motion about an axis, a tool comprising a rod having a cutting surface protruding slightly from the central portion of the lateral surface thereof, one end of said rod terminating in a squared shank, the other end of said rod being screw-threaded, and C-shaped supporting means, one arm of said supporting means being formed with a square hole for the reception of the squared shank of said rod, the other arm of said supporting means being formed with a hole loosely receiving the threaded end of said rod, a pair of nuts threaded on said threaded end on opposite sides of the end of said last-mentioned arm, means connecting the central part of said supporting means to said tool-head, said connecting means being adjustable for varying the distance of said rod from said tool-head, and being capable of so positioning said supporting means that said rod is supported with its axis parallel to the axis of said device and adjacent thereto, with the axis of said rod lying between said cutting surface and said tool-head.

2. For use in a device having a tool-head mounted for arcuate motion about an axis, a tool comprising a rod having a cutting surface protruding slightly from the central portion of the lateral surface thereof, a C-shaped supporting means engaging the ends of said rod and holding said rod against rotation with respect thereto, and means adjustably connecting said supporting means to said tool-head in such a position that said rod is supported against movement with respect to said tool head with its axis parallel to the axis of said device, and the axis of said rod lies between said cutting surface and said tool head.

3. A diamond tool capable of making deep concave cuts of small radius, comprising a rod, a diamond embedded directly in the material of said rod with its point protruding from the lateral surface thereof, and means engaging the ends of said rod and adapted to move said diamond point in arcuate motion about any one of a plurality of parallel axes, said axes including the axis of said rod.

4. A tool capable of making deep concave cuts of small radius, comprising a rod, a cutting surface protruding slightly from the central portion of the lateral surface of said rod, and means engaging the ends of said rod and adapted to move said cutting edge in arcuate motion about any one of a plurality of parallel axes, said axes including the axis of said rod.

5. A diamond tool capable of making deep concave cuts of small radius, comprising a rod, a diamond imbedded directly in the material of said rod, its point protruding from the lateral surface thereof, supporting means engaging the ends of said rod and holding said rod against rotation with respect thereto and means acting on said supporting means to rotate said rod about its axis.

6. A tool capable of making deep concave cuts of small radius, comprising a rod, a cutting surface formed on the central portion of the lateral surface thereof, supporting means engaging the ends of said rod and holding said rod against rotation with respect thereto, and means acting upon said supporting means to rotate said rod about its axis.

7. A diamond tool capable of making deep concave cuts of small radius, comprising a rod and a diamond imbedded directly in the material of said rod with its point protruding from the lateral surface thereof.

8. A diamond tool capable of making deep concave cuts of small radius, comprising a rod, a diamond imbedded directly in the material of said rod, with its point protruding from the lateral surface of said rod by a distance not substantially greater than the desired depth of penetration of said diamond into the material to be cut, and means for rotating said rod about a plurality of parallel axes, including its own.

JOSEPH E. O'NEILL.